US012807103B2

(12) United States Patent
Min et al.

(10) Patent No.: US 12,807,103 B2
(45) Date of Patent: Nov. 24, 2026

(54) ADJUSTABLE BRAKE BY WIRE SYSTEMS AND METHODS

(71) Applicant: GM GLOBAL TECHNOLOGY OPERATIONS LLC, Detroit, MI (US)

(72) Inventors: Byungjin Min, Gimpo (KR); Minsu Lee, Gimpo (KR); Seokju Yong, Bucheon-si (KR); Yong-Kyu Kim, Seo-gu (KR)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 24 days.

(21) Appl. No.: 19/024,407

(22) Filed: Jan. 16, 2025

(65) Prior Publication Data

US 2026/0200445 A1 Jul. 16, 2026

(51) Int. Cl.
*B60T 7/06* (2006.01)
*B60T 7/04* (2006.01)

(52) U.S. Cl.
CPC ................ *B60T 7/06* (2013.01); *B60T 7/042* (2013.01); *B60T 2220/02* (2013.01); *B60T 2220/04* (2013.01); *B60T 2270/82* (2013.01)

(58) Field of Classification Search
None
See application file for complete search history.

(56) References Cited

U.S. PATENT DOCUMENTS

2006/0041359 A1* 2/2006 Ohtsubo .............. B60N 2/1695 701/45
2008/0047770 A1* 2/2008 Breed .................... G05G 1/405 701/45
2015/0107402 A1* 4/2015 Leem ....................... G05G 5/03 74/512

* cited by examiner

*Primary Examiner* — Daniel D Yabut

(57) ABSTRACT

A brake pedal adjustment system for a brake by wire braking system includes: a target module configured to selectively determine a target resting position for a brake pedal based on at least one of: a leg length of a driver of a vehicle; a foot size of the driver of the vehicle; a longitudinal position of a driver's seat of the vehicle; a position of a steering wheel of the vehicle; and an angle of a seat back of the driver's seat of the vehicle; and an actuation module configured to actuate a brake pedal actuator thereby adjusting a resting position of the brake pedal to the target resting position.

20 Claims, 6 Drawing Sheets

ADJUSTABLE BRAKE BY WIRE SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to brake by wire systems and more particularly to systems and methods for adjusting resting brake pedal position of brake by wire braking systems.

Vehicles include one or more torque producing devices, such as an internal combustion engine and/or an electric motor. A passenger of a vehicle rides within a passenger cabin (or passenger compartment) of the vehicle.

Vehicles may include one or more different types of sensors that sense vehicle surroundings. One example of a sensor that senses vehicle surroundings is a camera configured to capture images of the vehicle surroundings. Examples of such cameras include forward-facing cameras, rear-facing cameras, and side facing cameras. Another example of a sensor that senses vehicle surroundings includes a radar sensor configured to capture information regarding vehicle surroundings. Other examples of sensors that sense vehicle surroundings include sonar sensors and light detection and ranging (LIDAR) sensors configured to capture information regarding vehicle surroundings.

SUMMARY

In a feature, a brake pedal adjustment system for a brake by wire braking system includes: a target module configured to selectively determine a target resting position for a brake pedal based on at least one of: a leg length of a driver of a vehicle; a foot size of the driver of the vehicle; a longitudinal position of a driver's seat of the vehicle; a position of a steering wheel of the vehicle; and an angle of a seat back of the driver's seat of the vehicle; and an actuation module configured to actuate a brake pedal actuator thereby adjusting a resting position of the brake pedal to the target resting position.

In further features, the target module is configured to determine the target resting position based on the leg length of the driver of the vehicle.

In further features, the target module is configured to: move the target resting position further from a floor surface of the vehicle as the leg length of the driver increases; and move the target resting position closer to the floor surface of the vehicle as the leg length of the driver decreases.

In further features, a leg length module is configured to determine the leg length of the driver based on the longitudinal position of the driver's seat of the vehicle.

In further features, the target module is configured to determine the target resting position based on the foot size of the driver of the vehicle.

In further features, the target module is configured to: move the target resting position closer to a floor surface of the vehicle as the foot size of the driver increases; and move the target resting position further from the floor surface of the vehicle as the foot size of the driver decreases.

In further features, the foot size is a length from a heel to a toe of the foot of the driver.

In further features, a foot size module is configured to determine the foot size of the driver based on actuation of the brake pedal by the driver.

In further features, the foot size module is configured to determine the foot size of the driver based on a rate of change of a brake pedal position measured by a brake pedal position sensor during the actuation of the brake pedal by the driver.

In further features, the target module is configured to determine the target resting position based on the longitudinal position of the driver's seat.

In further features, the target module is configured to: move the target resting position closer to a floor surface of the vehicle as the longitudinal position of the driver's seat approaches a front of the vehicle; and move the target resting position further from the floor surface of the vehicle as the longitudinal position of the driver's seat approaches a rear of the vehicle.

In further features, the target module is configured to determine the target resting position based on the position of the steering wheel.

In further features, the position of the steering wheel is a vertical position of the steering wheel.

In further features, the target module is configured to: move the target resting position further from a floor surface of the vehicle as the vertical position of the steering wheel increases in height; and move the target resting position closer to the floor surface of the vehicle as the vertical position of the steering wheel decreases in height.

In further features, the position of the steering wheel is a telescopic position of the steering wheel.

In further features, the target module is configured to: move the target resting position further from a floor surface of the vehicle as the telescopic position of the steering wheel approaches the driver; and move the target resting position closer to the floor surface of the vehicle as the telescopic position of the steering wheel moves away from the driver.

In further features, the target module is configured to determine the target resting position based on the angle of the seat back of the driver's seat.

In further features, the target module is configured to: move the target resting position further from a floor surface of the vehicle as the angle of the seat back of the driver's seat increases; and move the target resting position closer to the floor surface of the vehicle as the angle of the seat back of the driver's seat decreases.

In a feature, a brake pedal adjustment system for a brake by wire braking system includes: a brake actuator configured to actuate a brake pedal; a target module configured to selectively determine a target resting position for the brake pedal based on: a leg length of a driver of a vehicle; a foot size of the driver of the vehicle; a longitudinal position of a driver's seat of the vehicle; a position of a steering wheel of the vehicle; and an angle of a seat back of the driver's seat of the vehicle; and an actuation module configured to actuate the brake pedal actuator thereby adjusting a resting position of the brake pedal to the target resting position.

In a feature, a brake pedal adjustment method for a brake by wire braking system is described and includes: selectively determining a target resting position for a brake pedal based on at least one of: a leg length of a driver of a vehicle; a foot size of the driver of the vehicle; a longitudinal position of a driver's seat of the vehicle; a position of a steering wheel of the vehicle; and an angle of a seat back of the driver's seat of the vehicle; and actuating a brake pedal actuator thereby adjusting a resting position of the brake pedal to the target resting position.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle includes friction brakes that are used to slow the vehicle. In mechanical braking systems, a brake pedal is mechanically linked to a brake booster. Actuation of the brake pedal actuates the brake booster and pushes hydraulic fluid toward the friction brakes to slow the vehicle.

In brake by wire braking systems, no mechanical link between the brake booster and the brake pedal is provided. A brake pedal position sensor measures a brake pedal position relative to a resting brake pedal position, and a brake control module controls application of the friction brakes based on the brake pedal position.

The present application involves adjusting the resting position of the brake pedal based on one or more parameters to increase comfort of the driver. Example parameters may include a position of a steering wheel, an angle of a seat back of a driver's seat, a longitudinal position of the driver's seat, a length of legs of the driver of the vehicle, and a size of a foot of the driver. Adjusting the resting position of the brake pedal based on the parameter(s) increases comfort and also increases accuracy of braking by the driver.

Figure 1:
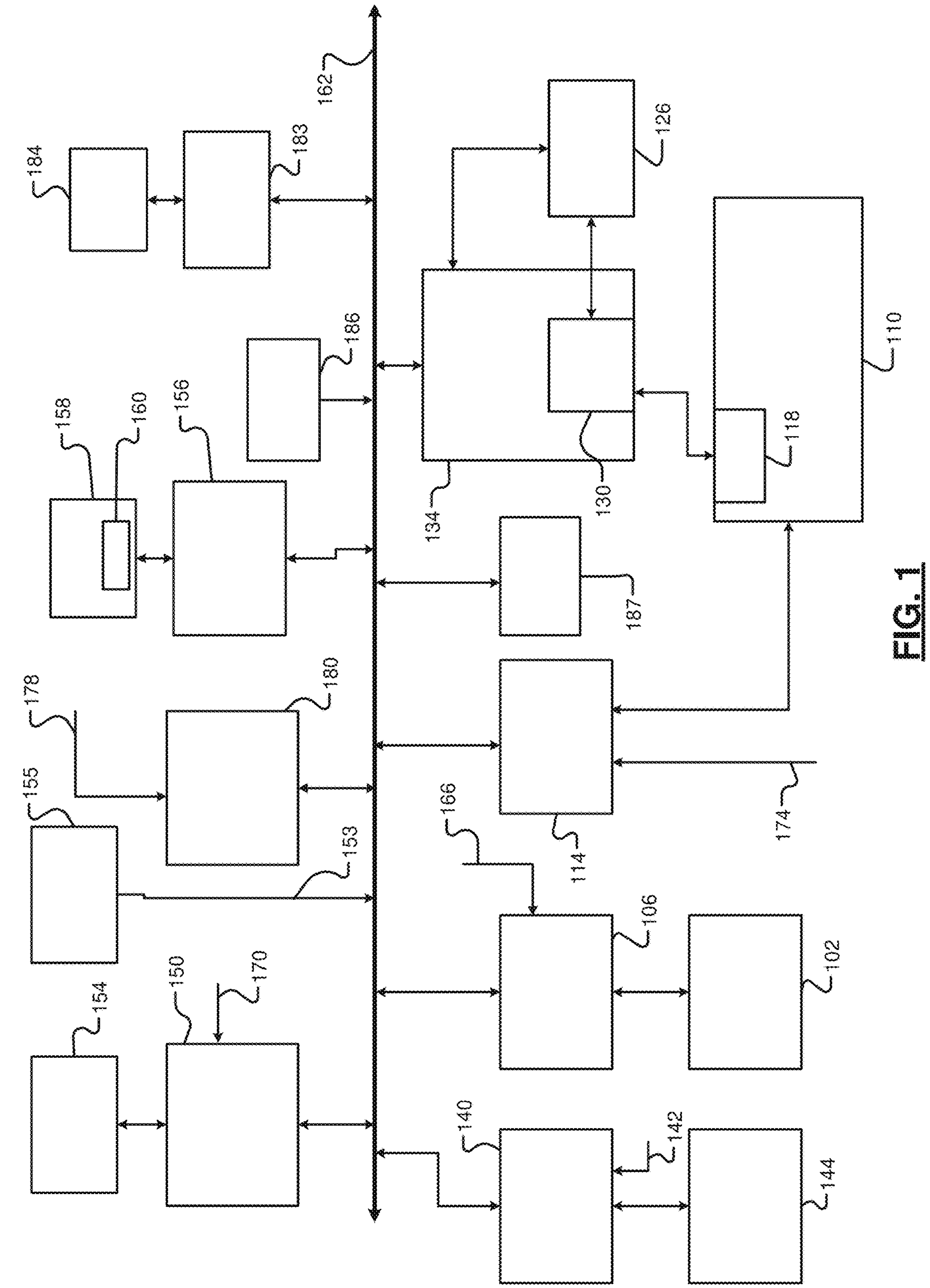
FIG. 1 is a functional block diagram of an example vehicle system.

Referring now to FIG. 1, a functional block diagram of an example vehicle system is presented. While a vehicle system for a hybrid vehicle is shown and will be described, the present application is also applicable to non-hybrid vehicles, electric vehicles, fuel cell vehicles, and other types of vehicles. The present application is applicable to autonomous vehicles, semi-autonomous vehicles, non-autonomous vehicles, shared vehicles, non-shared vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter module (PIM) 134 may control the electric motor 118 and the PCD 130. The PCD 130 applies power from the battery 126 to the electric motor 118 based on signals from the PIM 134, and the PCD 130 provides power output by the electric motor 118, for example, to the battery 126. The PIM 134 may include, for example, an inverter.

A steering control module 140 controls steering/turning of wheels of the vehicle, for example, based on driver turning of a steering wheel within the vehicle and/or steering commands from one or more vehicle control modules. A steering wheel angle (SWA) sensor (not shown) monitors rotational position of the steering wheel and generates a SWA 142 based on the position of the steering wheel. As an example, the steering control module 140 may control vehicle steering via an electronic power steering (EPS) motor 144 based on the SWA 142. However, the vehicle may include another type of steering system.

A brake control module 150 may selectively control (e.g., friction) brakes 154 of the vehicle based on one or more driver inputs, such as a brake pedal position (BPP) 170. Another driver input may be a cruise control input 153 from a cruise control module 155 when cruise control is enabled.

The braking system of the vehicle is a brake by wire system where actuation of a brake pedal does not mechanically actuate the brakes 154. Instead, actuation of the brakes 154 is performed based on the brake pedal position 170. The brake pedal position 170 may be expressed relative to a resting brake pedal position where the brake pedal returns when no pressure is applied to the brake pedal. The brake pedal position 170 may be zero when the brake pedal is in the resting brake pedal position. The brake pedal position 170 may increase as the brake pedal is actuated away from the resting brake pedal position and toward a floor of the vehicle. The brake control module 150 may increase application of the brakes 154 as the brake pedal position 170 increases and vice versa. The brake control module 150 may not apply the brakes 154 when the brake pedal position 170 is zero. As discussed further below, the brake pedal is adjustable such that the resting brake pedal position can be changed for driver comfort.

A damper control module 156 controls damping of dampers 158 of the wheels, respectively, of the vehicle. The dampers 158 damp vertical motion of the wheels. The damper control module 156 may control, for example, damping coefficients of the dampers 158, respectively. For example, the dampers 158 may include magnetorheological dampers, continuous damping control dampers, or another suitable type of adjustable damper. The dampers 158 include actuators 160 that adjust damping of the dampers 158, respectively. In the example of magnetorheological dampers, the actuators 160 may adjust magnetic fields applied to magnetorheological fluid within the dampers 158, respectively, to adjust damping.

Modules of the vehicle may share parameters via a network 162, such as a controller area network (CAN). A CAN may also be referred to as a car area network. For example, the network 162 may include one or more data buses. Various parameters may be made available by a given module to other modules via the network 162.

The driver inputs may include, for example, an accelerator pedal position (APP) 166 which may be provided to the ECM 106. The BPP 170 may be provided to the brake control module 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

An infotainment module 183 may output various information via one or more output devices 184. The output devices 184 may include, for example, one or more displays (non-touch screen and/or touch screen), one or more other suitable types of video output devices, one or more speakers, one or more haptic devices, and/or one or more other suitable types of output devices.

The infotainment module 183 may output video via the one or more displays. The infotainment module 183 may output audio via the one or more speakers. The infotainment module 183 may output other feedback via one or more haptic devices. For example, haptic devices may be included with one or more seats, in one or more seat belts, in the steering wheel, etc. Examples of displays may include, for example, one or more displays (e.g., on a front console) of the vehicle, a head up display (HUD) that displays information via a substrate (e.g., windshield), one or more displays that drop downwardly or extend upwardly to form panoramic views, and/or one or more other suitable displays.

The vehicle may include a plurality of external sensors and cameras, generally illustrated in FIG. 1 by 186. One or more actions may be taken based on input from the external sensors and cameras 186. For example, the infotainment module 183 may display video, various views, and/or alerts on a display via input from the external sensors and cameras 186 during driving.

As another example, brake control module 150 and/or the steering control module 140 may apply the brakes 154 and/or steer the vehicle to avoid the vehicle colliding with an object around the vehicle.

The vehicle may include one or more additional control modules that are not shown, such as a chassis control module, a battery pack control module, etc. The vehicle may omit one or more of the control modules shown and discussed.

Figure 2:
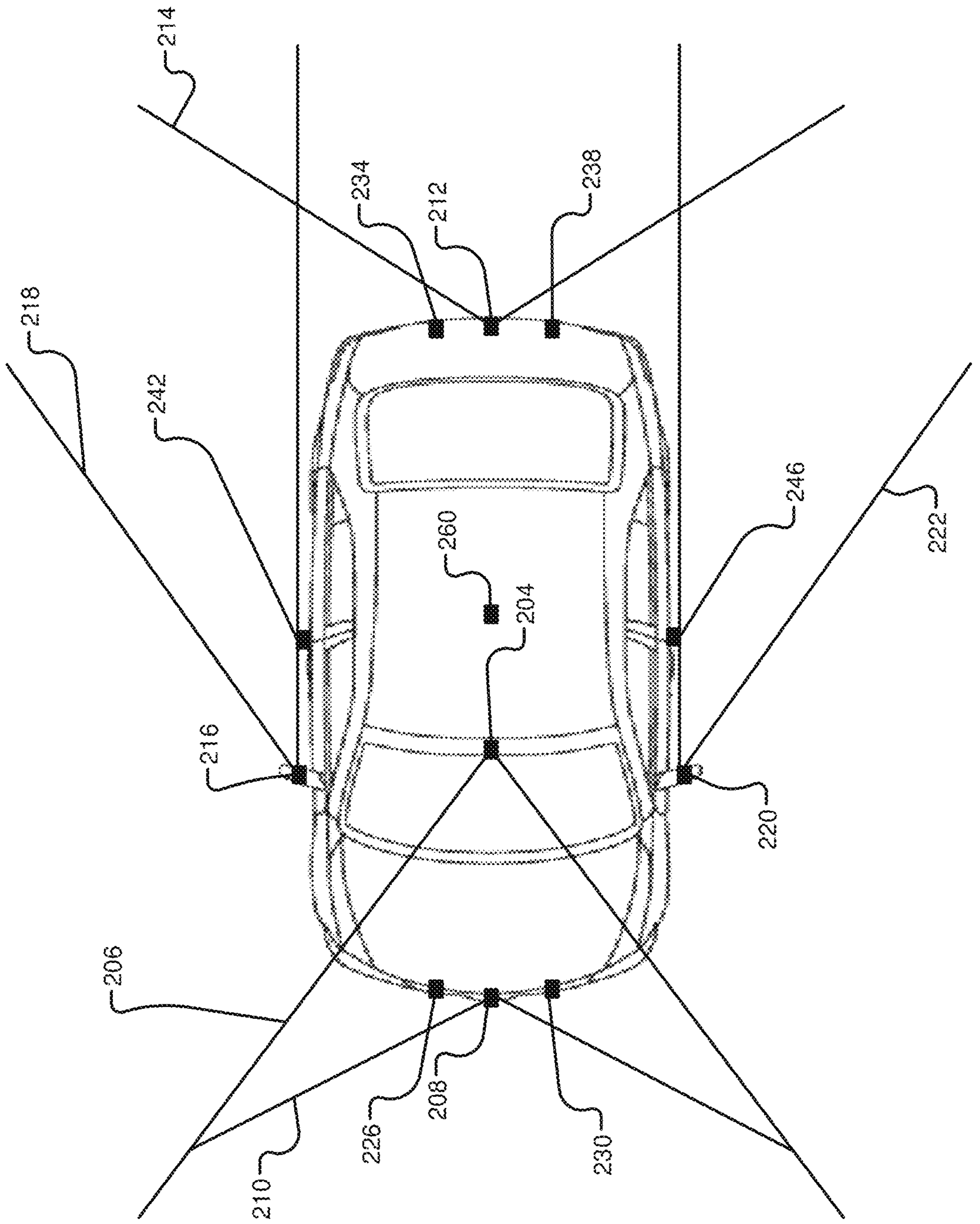
FIG. 2 is a functional block diagram of a vehicle including various external cameras and sensors.

Referring now to FIG. 2, a functional block diagram of a vehicle including examples of external sensors and cameras is presented. The external sensors and cameras 186 (FIG. 1) include various cameras positioned to capture images and video outside of (external to) the vehicle and various types of sensors measuring parameters outside of (external to) the vehicle. Examples of the external sensors and cameras 186 will now be discussed. For example, a forward-facing camera 204 captures images and video of images within a predetermined field of view (FOV) 206 in front of the vehicle.

A front camera 208 may also capture images and video within a predetermined FOV 210 in front of the vehicle. The front camera 208 may capture images and video within a predetermined distance of the front of the vehicle and may be located at the front of the vehicle (e.g., in a front fascia, grille, or bumper). The forward-facing camera 204 may be located more rearward, however, such as with a rear-view mirror at a windshield of the vehicle. The forward-facing camera 204 may not be able to capture images and video of items within all of or at least a portion of the predetermined FOV of the front camera 208 and may capture images and video more than the predetermined distance of the front of the vehicle. In various implementations, only one of the forward-facing camera 204 and the front camera 208 may be included.

A rear camera 212 captures images and video within a predetermined FOV 214 behind the vehicle. The rear camera 212 may be located at the rear of the vehicle, such as near a rear license plate.

A right camera 216 captures images and video within a predetermined FOV 218 to the right of the vehicle. The right camera 216 may capture images and video within a predetermined distance to the right of the vehicle and may be located, for example, under a right side rear-view mirror. In various implementations, the right side rear-view mirror may be omitted, and the right camera 216 may be located near where the right side rear-view mirror would normally be located.

A left camera 220 captures images and video within a predetermined FOV 222 to the left of the vehicle. The left camera 220 may capture images and video within a predetermined distance to the left of the vehicle and may be located, for example, under a left side rear-view mirror. In various implementations, the left side rear-view mirror may be omitted, and the left camera 220 may be located near where the left side rear-view mirror would normally be located. While the example FOVs are shown for illustrative purposes, the present application is also applicable to other FOVs. In various implementations, FOVs may overlap, for example, for more accurate and/or inclusive stitching.

The external sensors and cameras 186 may additionally or alternatively include various other types of sensors, such as light detection and ranging (LIDAR) sensors, ultrasonic sensors, radar sensors, and/or one or more other types of sensors. For example, the vehicle may include one or more forward-facing ultrasonic sensors, such as forward-facing ultrasonic sensors 226 and 230, one or more rearward facing ultrasonic sensors, such as rearward facing ultrasonic sensors 234 and 238. The vehicle may also include one or more right side ultrasonic sensors, such as right side ultrasonic sensor 242, and one or more left side ultrasonic sensors, such as left side ultrasonic sensor 246. The vehicle may also include one or more light detection and ranging (LIDAR) sensors, such as LIDAR sensor 260. The locations of the cameras and sensors are provided as examples only and different locations could be used. Ultrasonic sensors output ultrasonic signals around the vehicle.

The external sensors and cameras 186 may additionally or alternatively include one or more other types of sensors, such as one or more sonar sensors, one or more radar sensors, and/or one or more other types of sensors.

Figure 3:
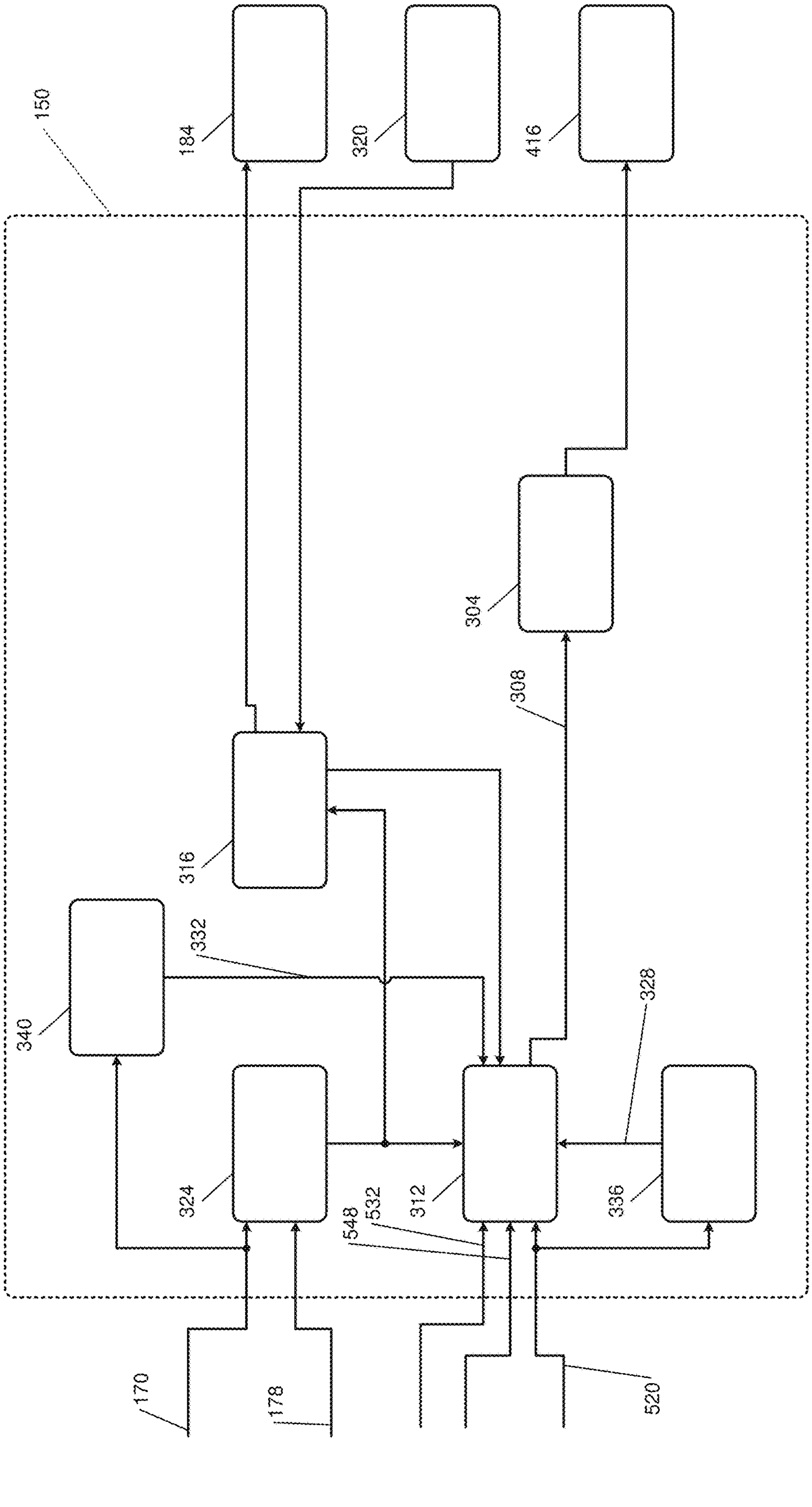
FIG. 3 is a functional block diagram of an example brake pedal actuation system.
Figure 4:
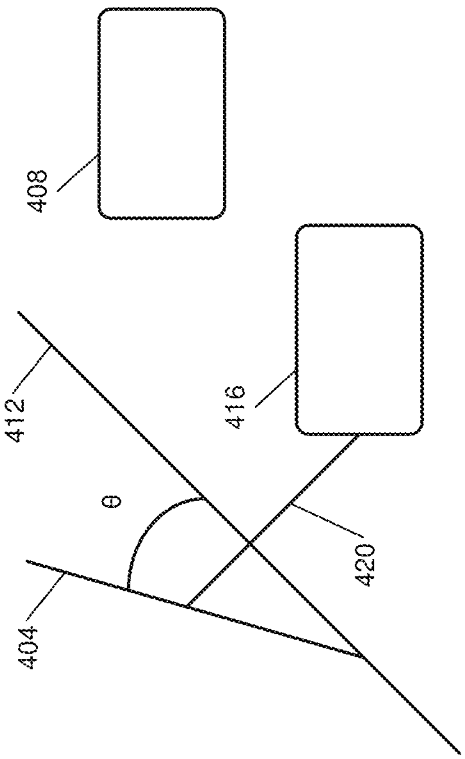
FIG. 4 is a side perspective view including an example illustration of a brake pedal.

FIG. 3 is a functional block diagram of an example brake pedal actuation system. FIG. 4 is a side perspective view including an example illustration of the brake pedal 404. As stated above, the brake pedal position sensor 408 measures the brake pedal position 170 relative to a resting brake pedal position of the brake pedal 404. An example resting brake pedal position (θ) is illustrated in FIG. 4 where no pressure (e.g., from a foot of the driver) is being applied to the brake pedal 404. The BPP sensor 408 measures the BPP 170 relative to the resting brake pedal position and may increase the BPP 170 as the brake pedal 404 moves toward a floor surface 412 of the vehicle.

A brake pedal actuator 416 moves the brake pedal 404 toward and away from the floor surface 412 thereby adjusting the resting brake pedal position. The brake pedal actuator 416 may move the brake pedal 404 via a rod 420. The brake pedal actuator 416 may include, for example, an electric motor, a linear actuator, or another suitable type of brake pedal actuator. Also, while the example of the rod 420 is provided, the brake pedal actuator 416 may move the brake pedal 404 and adjust the resting brake pedal position in another suitable manner.

Referring now to FIG. 3, an actuator module 304 actuates the brake pedal actuator 416 and adjusts the resting brake pedal position of the brake pedal 404 to a target position 308.

A target module 312 determines the target position 308 when prompted to determine the target position 308. For example, an input/output module 316 may selectively output an query to the driver via one or more of the output devices 184 regarding whether the target position 308 should be updated. For example, the input/output module 316 may output a query via one or more speakers (audibly) and/or one or more displays (visually) asking that the driver perform one or more acts if the driver would like the target position 308 to be updated. The one or more acts may include, for example, the driver actuating the brake pedal 404 toward the floor portion a predetermined number (e.g., two or more) times and/or performing one or more other acts via one or more input devices 320.

If the one or more acts are performed, the input/output module 316 prompts the target module 312 to determine/update the target position 308, and the actuation module 304 actuates the brake pedal 404 and adjusts the resting brake pedal position to the determined target position 308. If the one or more acts are not performed within a predetermined period or another input indicative of a “no” response are input, the target module 312 may leave the target position 308 unchanged and the actuation module 304 may leave the brake pedal 404 in its present resting position.

The input/output module 316 may output the query periodically, such as when triggered by a trigger module 324. The trigger module 324 may trigger the input/output module when one or more predetermined conditions are satisfied. Examples of the predetermined conditions include the ignition 178 transitioning from OFF to ON and the brake pedal position 170 being actuated away from the resting brake pedal position. Other predetermined conditions may include the driver adjusting a longitudinal position of the driver’s seat and/or adjusting a position of the steering wheel of the vehicle. The trigger module 324 may also trigger the target module 312 to obtain parameters to determine/update the target position 308.

Figure 5:
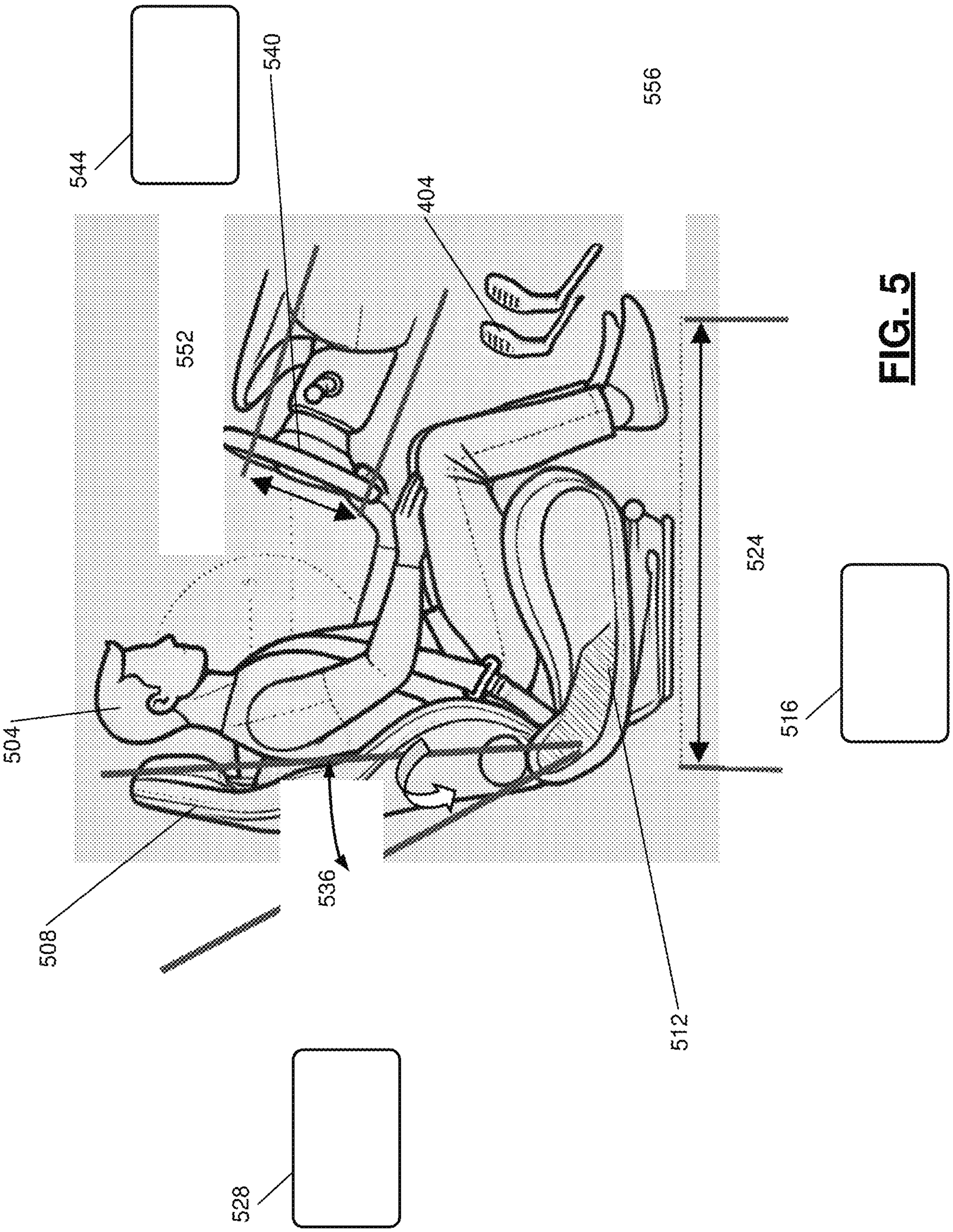
FIG. 5 includes an example perspective view toward a driver and a driver's seat.

FIG. 5 includes an example perspective view toward a driver 504 and a driver’s seat. The driver’s seat includes a back portion 508 and a seat portion 512. The driver’s seat is moveable longitudinally (parallel to a longitudinal axis of the vehicle) forward and backward in the vehicle. A seat position sensor 516 measures a longitudinal position 520 (FIG. 3) of the driver’s seat. An example of the seat position is illustrated by 524. A seat angle sensor 528 measures a seat back angle 532 (FIG. 3) of the driver’s seat. An example of the seat back angle is illustrated by 536.

FIG. 5 also illustrates the steering wheel 540. The steering wheel 540 may be telescopic and be configured to move toward and away from the driver. The steering wheel 540 may additionally or alternatively be pivotable and move adjustable vertically upwardly and downwardly. A steering wheel position sensor 544 measures a position 548 (e.g., telescopic and/or vertical; see FIG. 3) of the steering wheel 540. An example steering wheel position is illustrated by 552. An example foot size of a driver is illustrated by 556.

Referring back to FIG. 3, the target module 312 determines the target position 308 based on one, more than one, or all of (a) the seat position 520, (b) the seat back angle 532, (c) the steering wheel position 548, (d) a leg length 328 of the driver, and (e) a foot size 332 of the driver. The target module 312 may determine the target position 308, for example, using one or more lookup tables and/or equations that relate one or more of (a)-(e) to target positions. For example, the target module 312 may increase the angle (θ) as the seat back angle 532 increases and vice versa. Additionally or alternatively, the target module 312 may increase the angle (θ) as the seat position 520 increases and vice versa. Additionally or alternatively, the target module 312 may increase the angle (θ) as the steering wheel position 548 increases vertically upward and/or telescopically toward the driver and vice versa. Additionally or alternatively, the target module 312 may increase the angle (θ) as the leg length 328 increases and vice versa. Additionally or alternatively, the target module 312 may decrease the angle (θ) as the foot size 332 increases and vice versa.

A leg length module 336 determines the leg length 328 of the driver. The leg length module 336 may determine the leg length 328, for example, based on the longitudinal position 520 of the driver’s seat. The leg length module 336 may determine the leg length 328 using a lookup table and/or an equation that relates seat positions to leg lengths. For example, the length module 336 may increase the leg length 328 as the seat position moves longitudinally rearward and vice versa.

A foot size module 340 determines the foot size (e.g., heal to toe length) 332 of the driver. The foot size module 340 may determine the foot size 332 of the driver, for example, based on the brake pedal position 170 during actuation, such as based on a rate of change of the brake pedal position 170. The foot size module 340 may determine the foot size 332 using one or more equations and/or lookup tables that relate respective inputs to foot size. For example, the foot size module 340 may increase the foot size 332 as the rate of increase of the brake pedal position 170 increases during actuation and vice versa. Larger rates of increase of the brake pedal position 170 may correspond to larger feet. In various implementations, the foot size 332 of the driver may determined based on an image of the driver’s foot, such as taken using an under dashboard camera.

Figure 6:
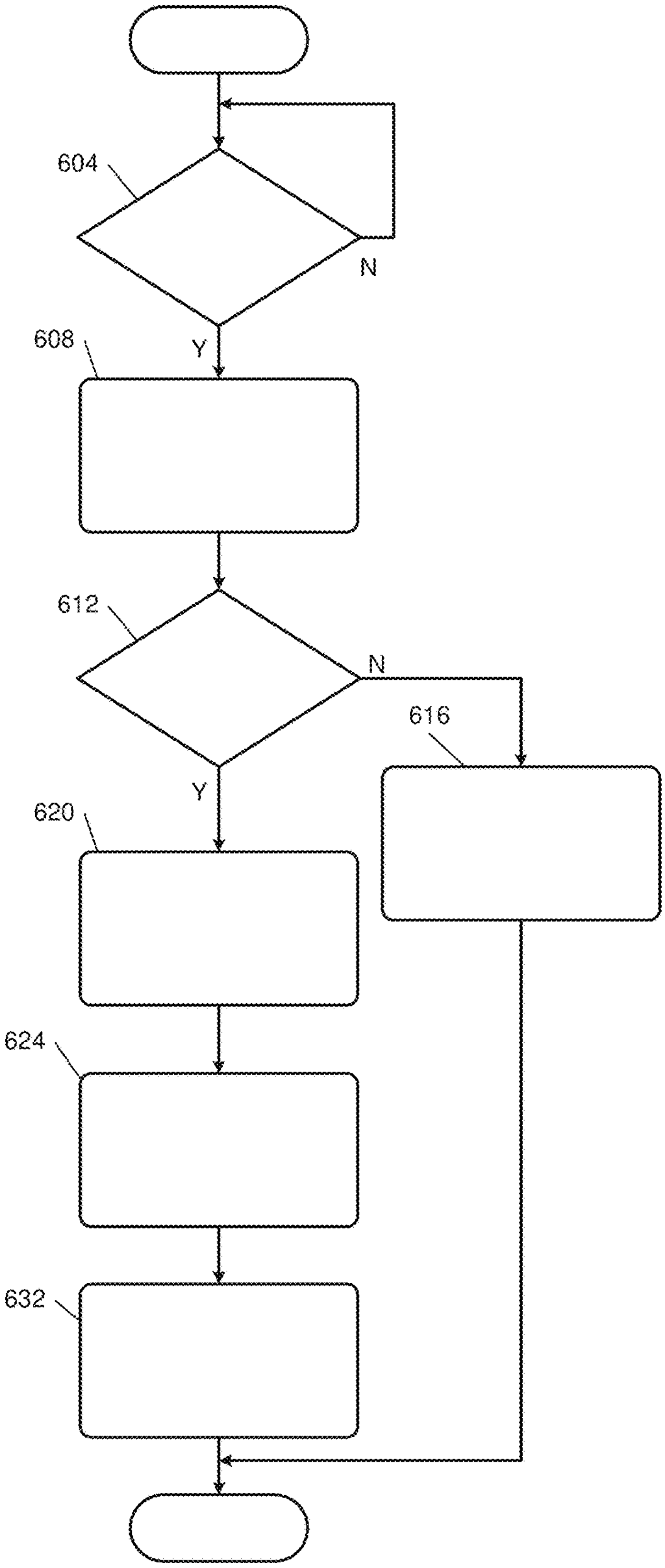
FIG. 6 is a flowchart depicting an example method of selectively adjusting the resting brake pedal position and adjusting the brake pedal.

FIG. 6 is a flowchart depicting an example method of selectively adjusting the resting brake pedal position and adjusting the brake pedal 404. A driver may adjust the seat position 520, the seat back angle 532, the steering wheel position 548, and/or one or more other parameters upon entering a vehicle to set up the vehicle for comfortable driving.

Control may begin with 604 where the trigger module 324 may determine whether the predetermined condition(s) are satisfied. If 604 is true, control may continue with 608. If 604 is false, control may remain at 604. At 608, the input/output module 316 outputs the query and instruction to take the one or more actions via one or more output devices 184.

At 612, the input/output module 316 determines whether the driver has taken the one or more actions, such as depressing the brake pedal (e.g., brake pedal position 170 greater than a predetermined position) two or more times within a predetermined period. If 612 is false, the target module 312 leaves the target position 308 unchanged, and the actuation module 304 does not adjust the resting brake pedal position at 616. If 612 is true, control may continue with 620.

At 620, the target module 312 obtains the one or more parameters used to determine the target position 308, such as the foot size 332 of the driver, the leg length 328 of the driver, the seat back angle 532 of the driver's seat, the steering wheel position 548, and/or the longitudinal position 520 of the driver's seat. At 624, the target module 312 determines/updates the target position 308 based on the obtained parameter(s), such as described above. At 632, the actuation module 304 actuates the brake pedal actuator 416 and adjusts the angle of the brake pedal 404 to the target position 308. In this way, the resting brake pedal position is adjusted for the driver.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A brake pedal adjustment system for a brake by wire braking system, the brake pedal adjustment system comprising:
- a target module configured to selectively determine a target resting position for a brake pedal based on at least one of:
  - a leg length of a driver of a vehicle;
  - a foot size of the driver of the vehicle;
  - a longitudinal position of a driver's seat of the vehicle;
  - a position of a steering wheel of the vehicle; and
  - an angle of a seat back of the driver's seat of the vehicle;
- an actuation module configured to actuate a brake pedal actuator thereby adjusting a resting position of the brake pedal to the target resting position,
- wherein the target module is configured to determine the target resting position based on the foot size of the driver of the vehicle; and
- a foot size module configured to determine the foot size of the driver based on actuation of the brake pedal by the driver,
- wherein the foot size module is configured to determine the foot size of the driver based on a rate of change of a brake pedal position measured by a brake pedal position sensor during the actuation of the brake pedal by the driver.

2. The brake pedal adjustment system of claim 1 wherein the target module is configured to determine the target resting position further based on the leg length of the driver of the vehicle.

3. The brake pedal adjustment system of claim 2 wherein the target module is configured to:
- move the target resting position further from a floor surface of the vehicle as the leg length of the driver increases; and
- move the target resting position closer to the floor surface of the vehicle as the leg length of the driver decreases.

4. The brake pedal adjustment system of claim 2 further comprising a leg length module configured to determine the leg length of the driver based on the longitudinal position of the driver's seat of the vehicle.

5. The brake pedal adjustment system of claim 1 wherein the target module is configured to:
- move the target resting position closer to a floor surface of the vehicle as the foot size of the driver increases; and
- move the target resting position further from the floor surface of the vehicle as the foot size of the driver decreases.

6. The brake pedal adjustment system of claim 1 wherein the foot size is a length from a heel to a toe of the foot of the driver.

7. The brake pedal adjustment system of claim 1 wherein the target module is configured to determine the target resting position further based on the longitudinal position of the driver's seat.

8. The brake pedal adjustment system of claim 7 wherein the target module is configured to:
- move the target resting position closer to a floor surface of the vehicle as the longitudinal position of the driver's seat approaches a front of the vehicle; and
- move the target resting position further from the floor surface of the vehicle as the longitudinal position of the driver's seat approaches a rear of the vehicle.

9. The brake pedal adjustment system of claim 1 wherein the target module is configured to determine the target resting position further based on the position of the steering wheel.

10. The brake pedal adjustment system of claim 9 wherein the position of the steering wheel is a vertical position of the steering wheel.

11. The brake pedal adjustment system of claim 10 wherein the target module is configured to:
- move the target resting position further from a floor surface of the vehicle as the vertical position of the steering wheel increases in height; and
- move the target resting position closer to the floor surface of the vehicle as the vertical position of the steering wheel decreases in height.

12. The brake pedal adjustment system of claim 9 wherein the position of the steering wheel is a telescopic position of the steering wheel.

13. The brake pedal adjustment system of claim 12 wherein the target module is configured to:
- move the target resting position further from a floor surface of the vehicle as the telescopic position of the steering wheel approaches the driver; and
- move the target resting position closer to the floor surface of the vehicle as the telescopic position of the steering wheel moves away from the driver.

14. The brake pedal adjustment system of claim 1 wherein the target module is configured to determine the target resting position further based on the angle of the seat back of the driver's seat.

15. The brake pedal adjustment system of claim 14 wherein the target module is configured to:
- move the target resting position further from a floor surface of the vehicle as the angle of the seat back of the driver's seat increases; and
- move the target resting position closer to the floor surface of the vehicle as the angle of the seat back of the driver's seat decreases.

16. A brake pedal adjustment system for a brake by wire braking system, the brake pedal adjustment system comprising:

a brake actuator configured to actuate a brake pedal;

a target module configured to selectively determine a target resting position for the brake pedal based on:

a leg length of a driver of a vehicle;

a foot size of the driver of the vehicle;

a longitudinal position of a driver's seat of the vehicle;

a position of a steering wheel of the vehicle; and an angle of a seat back of the driver's seat of the vehicle;

an actuation module configured to actuate the brake actuator thereby adjusting a resting position of the brake pedal to the target resting position, wherein the target module is configured to determine the target resting position based on the foot size of the driver of the vehicle; and a foot size module configured to determine the foot size of the driver based on actuation of the brake pedal by the driver, wherein the foot size module is configured to determine the foot size of the driver based on a rate of change of a brake pedal position measured by a brake pedal position sensor during the actuation of the brake pedal by the driver.

17. The brake pedal adjustment system of claim 16, wherein the target module is configured to determine the target resting position for the brake pedal based on the foot size of the driver and at least one of:

the leg length of the driver of the vehicle;

the longitudinal position of the driver's seat of the vehicle;

the position of the steering wheel of the vehicle; and the angle of the seat back of the driver's seat of the vehicle.

18. The brake pedal adjustment system of claim 16, wherein the target module is configured to determine the target resting position for the brake pedal based on the foot size of the driver and at least two of:

the leg length of the driver of the vehicle;

the longitudinal position of the driver's seat of the vehicle;

the position of the steering wheel of the vehicle; and the angle of the seat back of the driver's seat of the vehicle.

19. The brake pedal adjustment system of claim 16, wherein the target module is configured to determine the target resting position for the brake pedal based on the foot size of the driver and at least three of:

the leg length of the driver of the vehicle;

the longitudinal position of the driver's seat of the vehicle;

the position of the steering wheel of the vehicle; and the angle of the seat back of the driver's seat of the vehicle.

20. A brake pedal adjustment method for a brake by wire braking system, the method comprising:

selectively determining a target resting position for a brake pedal based on at least one of:

a leg length of a driver of a vehicle;

a foot size of the driver of the vehicle;

a longitudinal position of a driver's seat of the vehicle;

a position of a steering wheel of the vehicle; and an angle of a seat back of the driver's seat of the vehicle;

actuating a brake pedal actuator thereby adjusting a resting position of the brake pedal to the target resting position, wherein determining the target resting position includes determining the target resting position based on the foot size of the driver of the vehicle; and determining the foot size of the driver based on actuation of the brake pedal by the driver, wherein determining the foot size of the driver includes determining the foot size of the driver based on a rate of change of a brake pedal position measured by a brake pedal position sensor during the actuation of the brake pedal by the driver.

* * * * *